United States Patent
Hernandez

(10) Patent No.: US 7,634,773 B2
(45) Date of Patent: Dec. 15, 2009

(54) METHOD AND APPARATUS FOR THREAD SCHEDULING ON MULTIPLE PROCESSORS

(75) Inventor: Rafael M. Hernandez, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1149 days.

(21) Appl. No.: 10/997,571

(22) Filed: Nov. 24, 2004

(65) Prior Publication Data

US 2006/0112391 A1    May 25, 2006

(51) Int. Cl.
*G06F 9/46* (2006.01)
(52) U.S. Cl. .................. 718/102; 718/100; 718/105
(58) Field of Classification Search ................ 709/202; 718/100–108
See application file for complete search history.

(56) References Cited

U.S. PATENT DOCUMENTS

| | | | | |
|---|---|---|---|---|
| 3,530,438 A | * | 9/1970 | Nelson et al. | 718/100 |
| 4,642,756 A | * | 2/1987 | Sherrod | 718/103 |
| 5,115,505 A | * | 5/1992 | Bishop et al. | 718/104 |
| 5,179,702 A | | 1/1993 | Spix et al. | |
| 5,450,592 A | * | 9/1995 | McLeod | 718/104 |
| 5,542,088 A | * | 7/1996 | Jennings et al. | 718/103 |
| 5,826,081 A | * | 10/1998 | Zolnowsky | 718/103 |
| 6,167,424 A | * | 12/2000 | Bak et al. | 718/100 |
| 6,477,562 B2 | * | 11/2002 | Nemirovsky et al. | 718/108 |
| 2003/0018691 A1 | * | 1/2003 | Bono | 709/106 |

OTHER PUBLICATIONS

J. Kay and P. Lauder, "A Fair Share Scheduler", Jan. 1988, pp. 44-55, vol. 31 No. 1, Communications of the ACM.

* cited by examiner

*Primary Examiner*—Meng-Ai An
*Assistant Examiner*—Gregory A Kessler

(57) ABSTRACT

One embodiment disclosed relates to a method of distributing threads to processors of a multiprocessor computer system. Prior to assigning a thread at a current position in a thread list to a current processor number, a determination is made as to whether the thread is to be moved to a later position in the thread list. If the determination is made that the thread is to be moved, then the thread is moved to the later position in the thread list. On the other hand, if the determination is made that the thread is not to be moved, then the thread is assigned to the current processor number. Other embodiments are also disclosed.

24 Claims, 5 Drawing Sheets

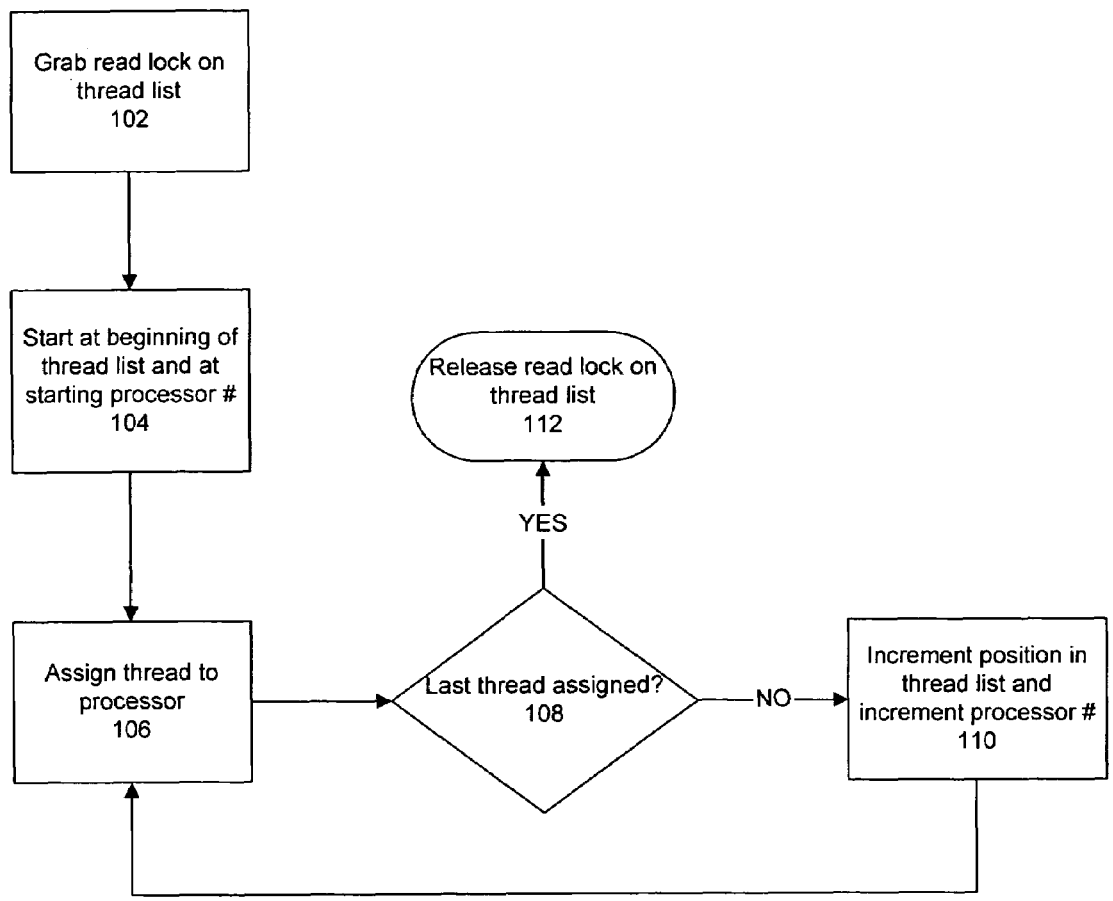
FIG. 1
(Conventional)

| Number | Thread |
|---|---|
| 1 | thread A |
| 2 | thread B |
| 3 | thread C |
| 4 | thread D |
| 5 | thread E |
| ... | ... |
| 24 | thread X |
| 25 | thread Y |

| Number | Thread |
|---|---|
| 1 | thread A |
| 2 | thread B |
| 3 | thread C |
| 4 | thread E |
| 5 | thread F |
| 6 | thread G |
| ... | ... |
| 24 | thread Y |
| 25 | thread D |

# METHOD AND APPARATUS FOR THREAD SCHEDULING ON MULTIPLE PROCESSORS

FIELD OF THE INVENTION

The present disclosure relates generally to computers and software.

DESCRIPTION OF THE BACKGROUND ART

A program module includes source code for part or all of a computer program. A compiler may be used to produce an object code file from a program module. The object code files from different program modules may be linked together into an executable file for the program. The executable form of a multithreaded program includes multiple threads. A thread is a logically independent part of a computer program and can therefore be executed in parallel with other threads.

In a multiprocessor computer system, the operating system is generally responsible for distributing threads to the various processors for execution. Such thread distribution or scheduling may be performed periodically, for instance, once every second or so.

One conventional technique for distributing threads amongst multiple processors is depicted in FIG. 1. After grabbing 102 a read lock on the thread list, the technique starts 104 at the beginning of the thread list and at a starting processor number. The starting processor number may be the same each time, or it may be varied. The current thread is assigned 106 to the current processor. The current position in the thread list and the current processor number are incremented 110, and the current thread is continued to be assigned 106, until the last thread is assigned 108. After the last thread is assigned, the distribution of threads is complete and the read lock on the thread list is released 112.

The conventional technique discussed above has various disadvantages. In particular, in certain circumstances, the thread scheduling may be undesirably non-uniform. In other words, the distribution of threads to processors may result in a distribution that is substantially unfair to some threads.

It is desirable to improve methods and apparatus for computers and software. In particular, it is desirable to improve methods and apparatus for distributing threads to processors of a multiprocessor computer system.

SUMMARY

One embodiment of the invention pertains to a method of distributing threads to processors of a multiprocessor computer system. Prior to assigning a thread at a current position in a thread list to a current processor number, a determination is made as to whether the thread is to be moved to a later position in the thread list. If the determination is made that the thread is to be moved, then the thread is moved to the later position in the thread list. On the other hand, if the determination is made that the thread is not to be moved, then the thread is assigned to the current processor number.

Another embodiment pertains to a method of distributing threads to processors wherein the thread list is walked starting at a selected initial position (not necessarily at the beginning of the list). For example, the initial position may be randomly selected.

Another embodiment pertains to a computer system including a plurality of microprocessors and an operating system. The operating system is configured to periodically distribute program threads from an active thread list to said microprocessors for execution thereof. The operating system is further configured such that, while walking through the active thread list, some of the threads are determined to be move to a later position in the list.

Another embodiment pertains to an operating system configured to distribute threads to processors of a multiprocessor computer system. The operating system includes computer-executable code configured to walk a current position through a thread list. The operating system further includes computer-executable code configured to make a determination as to whether a thread at the current position is to be moved to a later position in the thread list prior to assigning the thread to a current processor number.

Other embodiments are also disclosed.

BRIEF DESCRIPTION OF THE DRAWINGS

FIG. 1 is a flow chart depicting a conventional technique for distributing threads to processors of a multiprocessor computer system.

DETAILED DESCRIPTION

Figure 2:
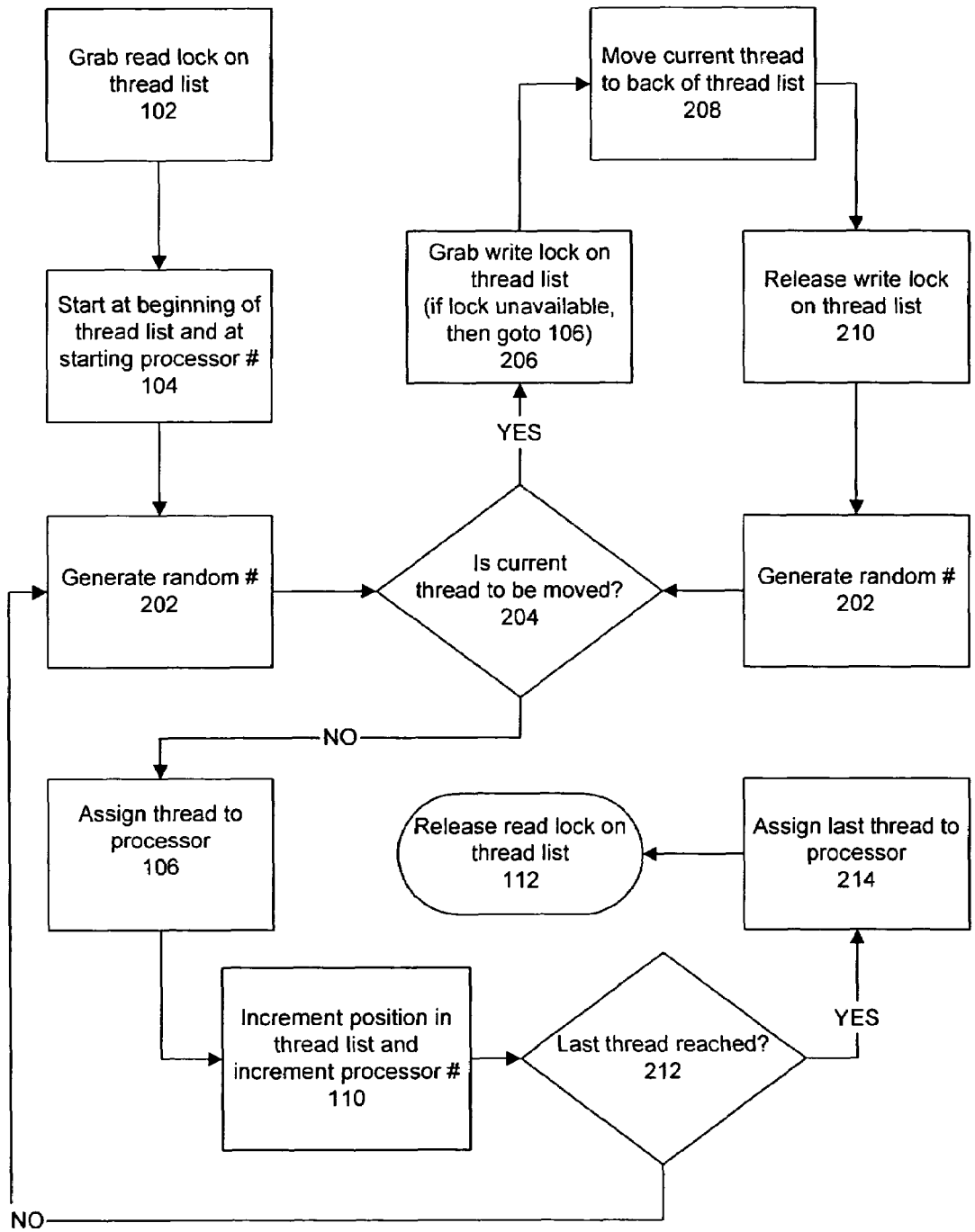
FIG. 2 is a flow chart depicting a method for distributing threads to processors of a multiprocessor computer system in accordance with an embodiment of the invention.
Figures 3, 4:
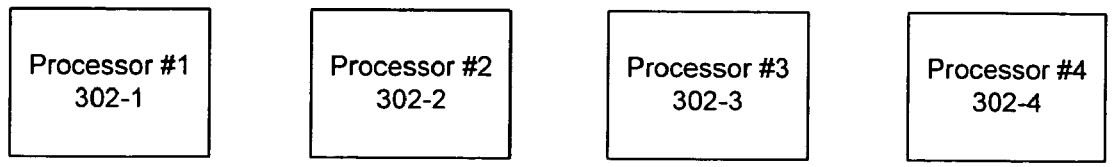
FIG. 3 is a block diagram depicting four processors of an example multiprocessor computer system for purposes of illustration.
FIG. 4 depicts an example thread list for purposes of illustration.

FIG. 2 is a flow chart depicting a method 200 for distributing threads to processors of a multiprocessor computer system in accordance with an embodiment of the invention. For purposes of illustration, FIG. 3 is a block diagram depicting processors of an example multiprocessor computer system, and FIG. 4 depicts an example thread list. The example multiprocessor computer system is shown with four processors (302-1, 302-2, 303-3, and 302-4), but other systems may have more than four processors or less than four processors. The example thread list shows a list having twenty-five threads, but an actual thread list will have a variable number of threads as the active threads change over time in a system. At times, an actual system may have hundreds or thousands or more active threads.

Like the conventional technique 100 shown in FIG. 1, the method 200 depicted in FIG. 2 begins by grabbing 102 a read lock on the thread list, and starting 104 at the beginning of the thread list (for instance, position number 1 in the thread list of FIG. 4) and at a starting processor number (for instance, at processor #2 in FIG. 3). Preferably, the starting processor number may be varied by rotation or by random selection. Alternatively, the starting processor number may be fixed.

Thereafter, the method 200 differs from the conventional technique 100. In this embodiment, a random number is generated 202. The random number may be generated 202 using various techniques known to those of skill in the pertinent art. Based on the random number, a determination 204 is made whether the current thread (the thread at the position being pointed to in the thread list) is to be moved from its position in the list. For example, the technique or algorithm for making this determination 204 may be set or configured such that a select fraction or percentage of the random numbers results in moving the position of the current thread. The higher the percentage, the more "thread rotation" or "thread shuffling" will occur. In a preferred embodiment, the percentage may be set so that sufficient thread rotation or shuffling occurs to provide a desired level of fairness, while avoiding the unnecessary impact to the performance of the computer system that would occur with too much thread rotation or shuffling.

In one embodiment, the system may be configured to move a thread a set percentage of the time, for instance, 15% or another set percentage. In another embodiment, the probability that a thread is moved may be configurable by the user within a range from a minimum percentage to a maximum percentage. In another embodiment, the probability that a thread is moved may depend on the current length of the threads list and/or the current length of the thread groups list (which lists groups of threads). In another embodiment, the probability that a thread is moved may depend upon the previous history of the thread scheduling.

If it is determined 204 that the current thread is to be moved, then the method 200 continues by grabbing 206 a write lock on the thread list. In one implementation, if the write lock is unavailable to be grabbed 206, then the method 200 skips moving the current thread and instead goes on to assign 106 the thread to the processor.

In accordance with a preferred embodiment of the invention, upon securing the write lock on the thread list, the current thread is then moved 208 to the back of the thread list. The remaining threads below the current position may be shifted up in the list. Thereafter the write lock on the thread list may be removed 210, and the method 200 may continue by going back to the step where a random number is generated 202 so as to determine 204 whether the current thread (the thread that was shifted up to the current position in the list) is to be moved.

Once it is determined 204 that the current thread is not to be moved, then the method 200 goes on to assign the current thread 106 to the current processor number. The position in the thread list and the processor number may then be incremented 110. (The incrementing 110 of the processor number involves looping from the last number to the first number.) A determination 212 may then be made as to whether the last thread has been reached. If the last thread has been reached, then there is no longer any need to generate a random number. Instead, the last thread is assigned 214 to the current processor. The distribution of threads is the complete, and the read lock on the thread list may be released 112. If the current thread is not the last thread in the list, then the method 200 may continue by going back to the step where a random number is generated 202 so as to determine 204 whether the current thread is to be moved.

In other embodiments, the above-discussed methods of thread scheduling may be modified so as to depend upon the previous history of the thread scheduling. For example, the system may be configured to track the number of times in the thread distribution period where a move is skipped due to the inability to obtain a write lock on the thread list. If this number exceeds a threshold, then the system may be configured to not allow for such skipping (i.e. to instead wait until the write lock is released) during the next thread distribution period. The previous history of the thread scheduling may be used in other ways in other embodiments.

Figures 5, 6:
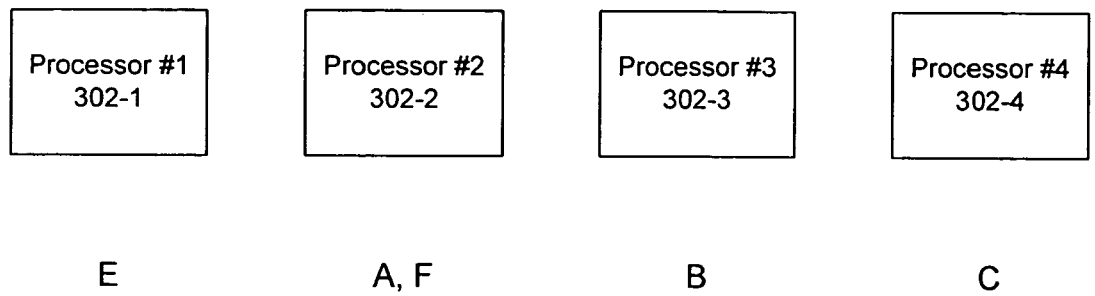
FIG. 5 is a diagram showing a partial assignment of threads to the processors of FIG. 3 in accordance with an embodiment of the invention.
FIG. 6 depicts the thread list of FIG. 4 after one thread has been moved to the end of the list in accordance with an embodiment of the invention.

For illustrative purposes, consider FIGS. 5 and 6. FIG. 5 is a diagram showing a partial assignment of threads to the processors of FIG. 3 in accordance with an embodiment of the invention. FIG. 6 depicts the thread list of FIG. 4 after one thread has been moved to the end of the list in accordance with an embodiment of the invention. In this case, consider that the random numbers generated resulted in determinations that threads A through C were not to be moved. These threads may then be assigned to processors #2 through #4, respectively, as shown in FIG. 5. Further consider that the random number generated for thread D resulted in a determination that thread D was to be moved to the end of the thread list. As such, thread D is moved to the last position on the thread list (position twenty-five in this instance), as shown in FIG. 6. Further consider that the random numbers generated for threads E and F resulted in determinations that they were not to be moved. These threads may then be assigned to processors #1 and #2, respectively, as shown in FIG. 5. Hence, at the point in time shown in FIGS. 5 and 6, the method is on position number 6 in the thread list (presently occupied by thread G). The method goes on until all the threads are assigned to processors, rotating selected threads to the end of the list when so indicated by the random numbers.

Figure 7:
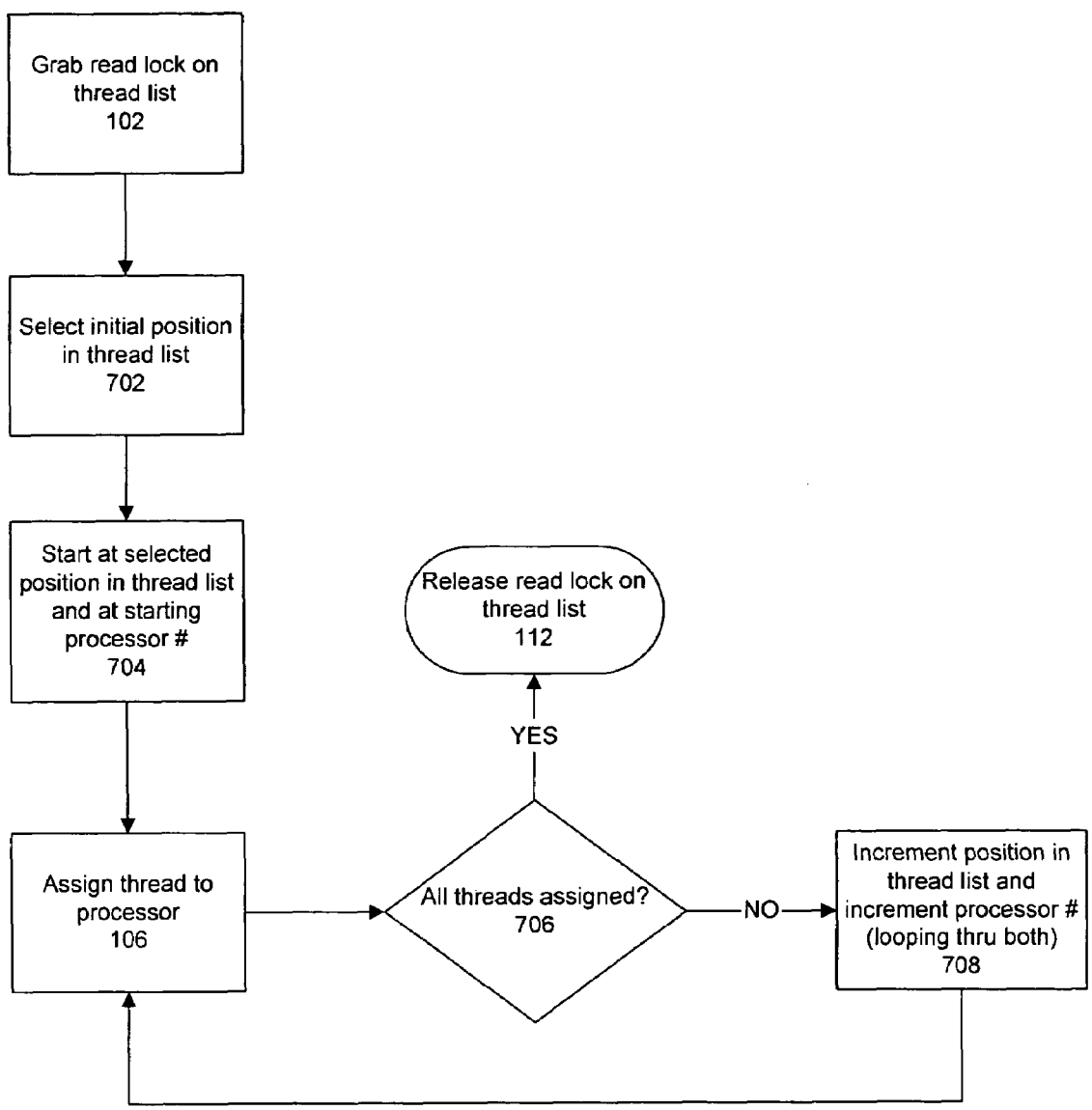
FIG. 7 is a flow chart depicting a method for distributing threads to processors of a multiprocessor computer system in accordance with another embodiment of the invention.

FIG. 7 is a flow chart depicting a method 700 for distributing threads to processors of a multiprocessor computer system in accordance with another embodiment of the invention. The method 700 of FIG. 7 is similar to the convention method 100 of FIG. 1. However, to improve the fairness of the thread scheduling, the method 700 of FIG. 7 does not always start the distribution process at the beginning of the thread list. Instead, the initial position in the thread list is selected 702 using a random determination, or on a rotating basis, or using another algorithm with similar effect. The method 700 of FIG. 7 starts 704 at this selected position in the thread list and at the starting processor number. The starting processor number may be the same each time, or it may be varied.

Similar to the conventional method 100, the method of FIG. 7 proceeds by assigning 106 the current thread to the current processor. The current position in the thread list and the current processor number are incremented 708, and the current thread is continued to be assigned 106, until it is determined 706 that all the threads in the thread list are assigned. (The incrementing 708 of the processor number involves looping from the last number to the first number. In addition, in this embodiment, the incrementing 708 of the position in the thread list involves looping from the end to the beginning of the thread list, as needed.) After all the threads in the list have been assigned, the distribution of threads is complete and the read lock on the thread list is released 112.

In accordance with another embodiment of the invention, the techniques of FIGS. 2 and 7 may be combined. In other words, the method 200 of FIG. 2 may be modified such that the distribution process does not start at the beginning of the thread list. Instead, the initial position in the thread list may be selected, as discussed above in relation to FIG. 7. The selection may be made using a random determination, or on a rotating basis, or using another algorithm with similar effect.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant are will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of distributing threads to processors of a multiprocessor computer system, the method comprising:
   prior to assigning a thread at a current position in a thread list to a current processor number, using a random number to determine whether the thread is to be moved to a later position in the thread list;
   responsive to determining that the thread is to be moved, then moving the thread to the later position in the thread list; and
   responsive to determining that the thread is not to be moved, then assigning the thread to the current processor number.

2. The method of claim 1, wherein the later position comprises an end position in the thread list.

3. The method of claim 1, further comprising:
   responsive to assigning the thread to the current processor, incrementing the current position in the thread list and the current processor number.

4. The method of claim 3, wherein incrementing the current processor number comprises looping back to a first processor number when a last processor number is passed.

5. The method of claim 3, wherein the current position is initially located at the beginning of the thread list.

6. The method of claim 5, wherein, if a last position in the thread list is reached, then the thread at the last position is assigned to the current processor number without determining whether the thread is to be moved.

7. The method of claim 3, further comprising:
   repeating the method until all the threads in the thread list have been assigned.

8. The method of claim 1, further comprising:
   grabbing a write lock on the thread list when the determination is made that the thread is to be moved; and
   releasing the write lock on the thread list after the thread has been moved to the later position in the thread list.

9. The method of claim 8, wherein the move is skipped if the write lock is unavailable.

10. The method of claim 9, wherein a history of skipped moves is tracked and used to determine whether to disallow future skipped moves.

11. The method of claim 1, wherein there is a set probability for determining that the thread is to be moved.

12. The method of claim 1, wherein a probability for determining that the thread is to be moved is configurable by a user.

13. The method of claim 1, wherein a probability for determining that the thread is to be moved depends on a current length of the thread list.

14. The method of claim 1, wherein a probability for determining that the thread is to be moved depends on a current length of a thread groups list.

15. The method of claim 1, wherein a probability for determining that the thread is to be moved depends on a previous history of thread distribution among the processors.

16. The method of claim 1, further comprising:
   using the random number in the determination such that a probability that the thread is to be moved depends on a previous history of thread distribution among the processors.

17. A computer system comprising:
   a plurality of microprocessors; and an operating system configured to periodically distribute program threads from an active thread list to said microprocessors for execution thereof wherein the operating system is further configured such that, while walking through the active thread list, randomly-generated numbers are used to select a portion of the threads to be moved to a later position in the list instead of being assigned to one of the microprocessors.

18. The computer system of claim 17, wherein the later position comprises an end position in the list.

19. The computer system of claim 17, wherein the determination of which threads to be moved is made such that there is a predetermined chance for the move.

20. The computer system of claim 14, wherein the operating system is further configured to randomly select the portion of the threads such that a probability of moving depends on a previous history of thread distribution among the microprocessors.

21. A computer program product comprising program instructions, embodied on a computer-readable medium, that are operable to cause a programmable processor to distribute threads to processors of a multiprocessor computer system, the program instructions comprising:
   computer-executable code configured to walk a current position through a thread list; and
   computer-executable code configured to generate a random number used to make a determination as to whether a thread at the current position is to be moved to a later position in the thread list instead of assigning the thread to a current processor number that identifies one of the processors.

22. The computer program product of claim 21, wherein the later position comprises an end position in the list.

23. The computer program product of claim 21, wherein the random determination as to whether the thread is to be moved is made such that there is a predetermined chance that the move is made.

24. The computer program product of claim 21, wherein the computer-executable code is further configured to make the random determination such that a probability of moving depends on a previous history of thread distribution among the processors.

* * * * *

UNITED STATES PATENT AND TRADEMARK OFFICE
CERTIFICATE OF CORRECTION

PATENT NO. : 7,634,773 B2 Page 1 of 1
APPLICATION NO. : 10/997571
DATED : December 15, 2009
INVENTOR(S) : Rafael M. Hernandez It is certified that error appears in the above-identified patent and that said Letters Patent is hereby corrected as shown below:

In column 4, line 29, after "702" insert -- so as to improve the fairness. The initial position may be selected 702 --.

Signed and Sealed this

Sixteenth Day of March, 2010

David J. Kappos
*Director of the United States Patent and Trademark Office*